US008860390B2

(12) United States Patent
Tam (10) Patent No.: US 8,860,390 B2
(45) Date of Patent: Oct. 14, 2014

(54) SWITCHING POWER SUPPLY OPPOSITE POLARITY INDUCTOR ARRANGEMENT (75) Inventor: Ching Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 12/794,652

(22) Filed: Jun. 4, 2010

(65) Prior Publication Data
US 2011/0298433 A1 Dec. 8, 2011

(51) Int. Cl.
| H02M 3/156 | (2006.01) |
| H02M 3/158 | (2006.01) |
| H01F 38/00 | (2006.01) |
| H02M 1/00 | (2006.01) |

(52) U.S. Cl.
CPC .......... *H02M 3/1588* (2013.01); *Y02B 70/1466* (2013.01); *H02M 3/156* (2013.01); *H02M 3/1584* (2013.01); *H01F 38/00* (2013.01); *H02M 2001/0064* (2013.01)
USPC ............................ 323/282; 323/232; 323/272

(58) Field of Classification Search
USPC .................. 323/224, 268, 271, 272, 282, 350
See application file for complete search history.

(56) References Cited

U.S. PATENT DOCUMENTS

| 4,703,409 | A | 10/1987 | Spreen | |
| 5,864,221 | A * | 1/1999 | Downs et al. | 320/134 |
| 6,094,038 | A * | 7/2000 | Lethellier | 323/282 |
| 6,188,209 | B1 * | 2/2001 | Poon et al. | 323/255 |
| 6,362,986 | B1 | 3/2002 | Schultz et al. | |
| 6,822,427 | B2 * | 11/2004 | Wittenbreder | 323/282 |
| 6,894,466 | B2 * | 5/2005 | Huang et al. | 323/272 |
| 6,979,980 | B1 * | 12/2005 | Hesterman et al. | 323/222 |
| 7,317,305 | B1 * | 1/2008 | Stratakos et al. | 323/282 |
| 7,498,783 | B2 | 3/2009 | Johnson | |
| 7,548,046 | B1 | 6/2009 | Stratakos et al. | |
| 7,636,242 | B2 | 12/2009 | Hazucha et al. | |
| 7,710,085 | B2 * | 5/2010 | Park et al. | 323/251 |
| 2002/0121881 | A1 * | 9/2002 | Wittenbreder, Jr. | 323/259 |
| 2005/0088156 | A1 * | 4/2005 | Cheung et al. | 323/282 |
| 2005/0093525 | A1 * | 5/2005 | Walters et al. | 323/272 |
| 2008/0205098 | A1 | 8/2008 | Xu et al. | |
| 2009/0100668 | A1 | 4/2009 | Harris et al. | |
| 2010/0148717 | A1 * | 6/2010 | Yang | 318/767 |
| 2010/0188871 | A1 * | 7/2010 | Kim et al. | 363/21.03 |

(Continued)

OTHER PUBLICATIONS

"Section 3 Windings", Magnetics Design 3—Windings, Internet download at: focus.ti.com/lit/ml/slup125/slup125.pdf—Admitted Prior Art (no date available), (pp. 3-1-3-11).

(Continued)

*Primary Examiner* — Adolf Berhane
*Assistant Examiner* — Gustavo Rosario Benitez
(74) *Attorney, Agent, or Firm* — Blakely, Sokoloff, Taylor & Zafman LLP (57) ABSTRACT

A switching power supply circuit has a controller, a power switch, and an inductor circuit that is coupled to a power node of the power switch and to a capacitor. The inductor circuit has several discrete component conductors that are connected to each other in parallel and laid out side-by-side and wired such that each of the inductors is oriented with opposite polarity relative to another adjacent one of the inductors. Each inductor has associated first and second traces that are used to wire it to the power node and the capacitor. These traces for one inductor have matched characteristics with those of an adjacent inductor. Other embodiments are also described and claimed.

10 Claims, 5 Drawing Sheets

(56) References Cited

U.S. PATENT DOCUMENTS

| | | | |
|---|---|---|---|
| 2010/0207695 A1* | 8/2010 | Bao | 331/117 FE |
| 2010/0295625 A1* | 11/2010 | Tanabe | 331/117 FE |
| 2010/0314713 A1* | 12/2010 | Mao et al. | 257/531 |

OTHER PUBLICATIONS

Bach, Christian, "Power Supply Layout—Layout considerations for Line-Power Supplies", Application Note 101, EnOcean, Jan. 2010, (4 pages).

Dixon, Lloyd, "Coupled Filter Inductors in Multi-Output Buck Regulators", Unitrode Corporation, Lexington, MA, USA, Seminar 500 Topic 5, Internet download at: focus.ti.com/lit/ml/slup082a/slup082a.pdf—Admitted Prior Art (no date available), (pp. 5-1-5-9; and R5-10).

Shi, Meng, "Design and Analysis of Multiphase Dc-Dc Converters with Coupled Inductors", A Thesis, Submitted to the Office of Graduate Studies of Texas A&M University in partial fulfillment of the requirements for the degree of Master of Science, May 2007, Major Subject: Electrical Engineering, (79 pages).

\* cited by examiner

SWITCHING POWER SUPPLY OPPOSITE POLARITY INDUCTOR ARRANGEMENT

An embodiment of the invention is related to switch mode power supplies used in portable or handheld computing systems such as smart phones and tablet-like computers. Other embodiments are also described.

BACKGROUND

Consumers' appetite for more performance and functionality from a small form factor, portable computing system such as a handheld wireless communications device typically outpaces developments in the power supply technology used in such systems. One of the constraints placed on such power supply circuits is that they be small yet able to deliver a relatively ripple free, regulated dc output voltage at steadily rising current levels (loads). For example, in the context of a smart phone, a switch mode power supply for running the digital logic processing and storage components of the phone needs to provide significantly more current than previous generation cellular phones, yet without being allowed a larger space in which to fit.

One of the bulkier components of a switch mode power supply is the energy storage inductor circuit, which is used to pass the specified load from the input power node to an output node. A filter capacitor is included to smooth out the ripple in the output voltage. As the specified load becomes larger, i.e. greater dc output current, the current rating of the inductor circuit must also increase. This is because, the inductor circuit needs to be able to pass the specified load current without losing efficiency due to increased heat dissipation from higher winding resistance and, in the case of magnetic cores, decreased inductance due to core saturation current. In most cases, an inductor with a higher rated current needs to be physically larger, in order to maintain the same inductance and heat dissipation capability. As performance requirements rise, it becomes more challenging to produce a cost efficient inductor circuit using discrete component inductors that will also fit within the tight confines of modern mobile devices.

SUMMARY

An embodiment of the invention is a switching power supply circuit having a controller, a power switch, and an inductor circuit. The inductor circuit provides a combined inductance between an output power node of the power switch and a capacitor. The inductor circuit has several discrete component inductors connected to each other in parallel and laid out side-by-side and wired such that each of the inductors is oriented with opposite polarity relative to another adjacent one of the inductors. Thus, rather than use a single relatively large discrete component inductor to meet a specified output current rating (load rating), several smaller, discrete component inductors are selected and connected in parallel, aligned side-by-side and with matched trace characteristics. The typical drop in overall inductance that results from wiring several inductors in parallel is negated by the side-by-side arrangement and printed wiring board trace matching, which aligns the magnetic fields of the individual inductors so as to enhance the effect of mutual inductance between the inductors, to result in a boosted total inductance (relative to the total inductance of several uncoupled inductors that are in parallel). Accordingly, not only is the total inductance enhanced, but also the load current can be divided between the different component conductors equally (assuming their individual inductance are equal), thereby allowing smaller individual component inductors to be used.

In another embodiment, an inductor circuit of a multi-phase switch mode power supply has multiple, discrete component inductors such that an inductor in one phase is aligned side by side with opposite polarity and matching traces with an inductor from an adjacent phase.

In yet another embodiment, where multiple power supply rails are each fed by a respective switch mode power supply, a discrete component inductor circuit of each the power supplies is aligned side by side with opposite polarity and matching traces with an inductor of another adjacent one of the power supplies.

In some cases, an inductor circuit of a switch mode power supply includes multiple discrete component inductors each of which is aligned side by side and with opposite polarity to another one of the inductors.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
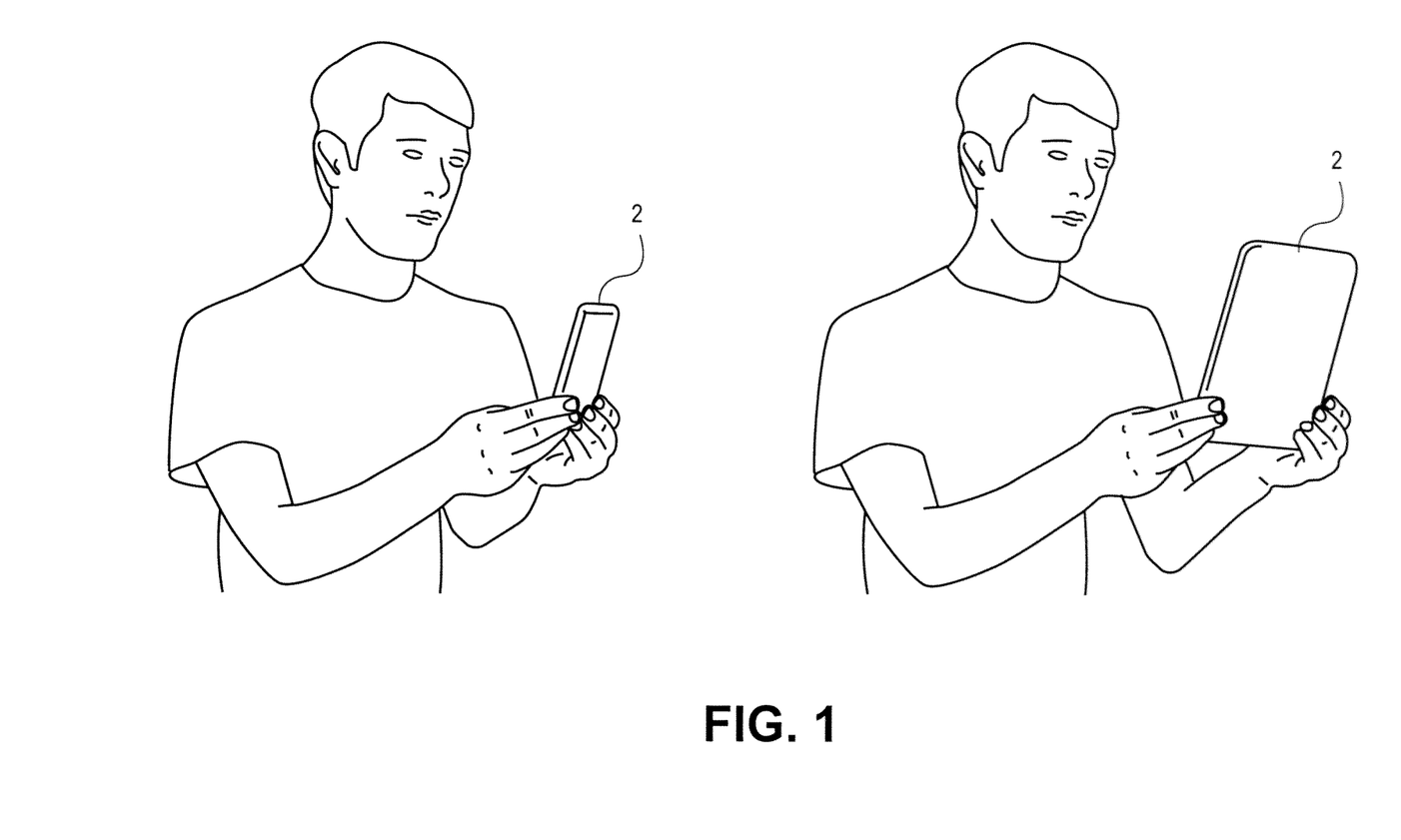
FIG. 1 shows a human user holding different types of a computing system, namely multi-function handheld or mobile devices such as a smart phone and a handheld tablet-like personal computer.

FIG. 1 shows a human user holding different types of a computing system, in this example a multi-function handheld mobile device referred to here as a personal mobile device 2. In one instance, the mobile device 2 is a smart phone or a multi-function cellular phone with several features typically available in such devices, such as a touch screen interface, music and video file recording and playback, digital camera, video games, and wireless applications such as voiceover Internet protocol telephony, electronic calendar, web browser, and email. In another instance, the mobile device 2 is a larger, handheld tablet-like computer such as an iPad™ by Apple Inc. In yet another instance, the mobile device 2 may be a laptop or notebook computer. A functional unit block diagram and some constituent hardware components of the device 2, for instance as found in an iPhone™ device by Apple Inc., is given FIG. 5 and described at the end of this document.

Most mobile devices 2 share a common characteristic in that they all have a relatively confined space or volume inside their electronic component housings. This constraint particularly affects a switch mode power supply of the device 2, which is responsible for reliably delivering a regulated dc power supply voltage to the various electronic components of the device. The power supply also referred to as a switching voltage regulator has a power input port that receives current from a battery in the device or from an external power source that may be temporarily connected to the device (e.g., an AC wall adapter, an automobile battery adapter). Current is then switched in rapid succession from the input power port to an output port, with feedback from a power output node of the power supply, to maintain a regulated, dc output voltage. A schematic of a single-phase switch mode power supply 10 is depicted in FIG. 2.

Figure 2:
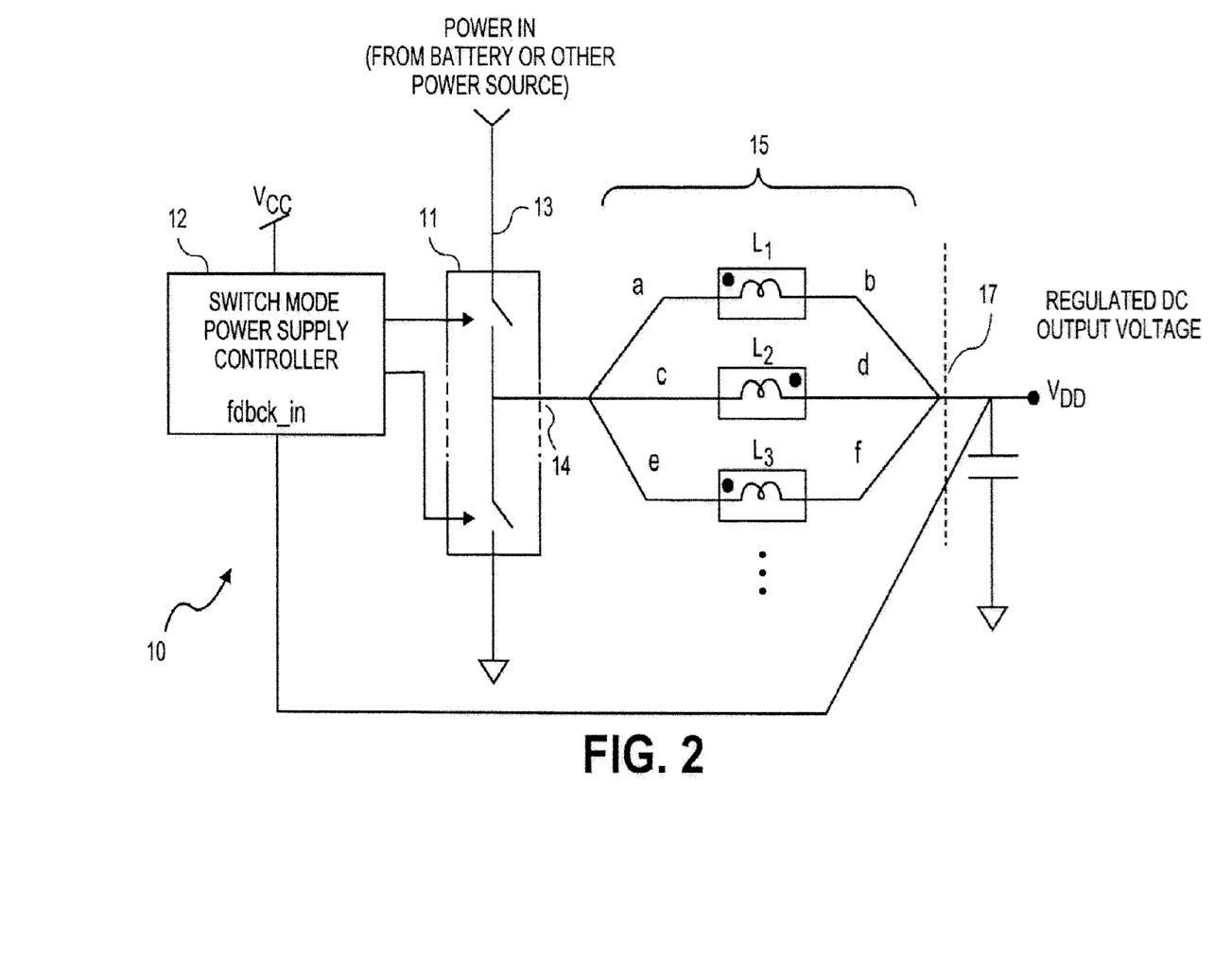
FIG. 2 is a circuit schematic of a switch mode power supply circuit with a particular arrangement for the inductor circuit.

Referring now to FIG. 2, the switch mode power supply (SMPS) 10 has an SMPS controller 12 with, in this example, a single phase control output that is connected to drive the control input of a power switch 11. The controller 12 generates a pulse width modulated (pwm) signal that turns on and turns off in rapid succession a high-side power switch 11, to control an average or dc current drawn from the source or input power node 13 to an output power node 17. The controller 12 may itself be powered by a different power supply circuit that is inside the housing of the device 2, described here as producing a power supply voltage Vcc. The SMPS controller 12 may include digital circuits such as state machines to produce the pulse width modulated signal, and analog circuits needed to, for instance, sample a signal at a feedback input, produce a reference voltage, and determine an error or difference between the reference and feedback signals based on which the pwm signal is adjusted as part of a negative feedback control loop.

An inductor circuit 15 is used for energy storage of the current drawn from the input power node 13. The inductor circuit 15 is series coupled between an output power node 14 of the power switch 11 on one side and to the output power node 17 at a shunt capacitor on the other side. The capacitor assists with energy storage and filters or reduces the voltage ripple that is produced on the output node 17 as a result of the switched current through the inductor circuit 15. A voltage signal from the node 17 is provided as part of a negative feedback control loop to the SMPS controller 12, which allows the controller 12 to maintain or regulate a dc output voltage at the node 17 in accordance with a desired reference voltage (not shown). For instance, the SMPS 10 may be a step down converter which converts a higher voltage from the battery or other power source at the power input node 13 to a lower, regulated dc voltage at node 17, by continuously switching on and off the power switch 11 so as to provide the current demanded by an attached load (not shown).

In the particular example shown in FIG. 2, a synchronous mode of operation is supported by the controller 12 where a second pulse width modulated signal is generated by the controller 12, to control the switching on and off of a low side power switch (shown as part of the power switch 11). The low side switch is synchronized so as turn on, allowing the current stored in the inductor circuit 15 to continue to circulate, when the high switch is turned off. The circulating current is from an input power return node in this example referred to as ground. Note that as an alternative, an asynchronous mode of operation may be supported where there is no low side switch that is being driven by a pulse width modulated signal. There, a diode is connected between the node 14 and the power return node of the switch 11 (ground) where the diode conducts whenever the high switch is turned off, thereby creating the needed current circulation path. In a particular embodiment, the SMPS 10 is a buck converter that produces 1.8 Volts regulated dc output voltage based on 3.7 Volts dc battery source. Other input and output voltage pairs are of course possible.

The inductor circuit 15 essentially consists of several discrete component inductors that are connected to each other in parallel (in this example three are shown as L1, L2, and L3). Each of these may be separately packaged, with a pair of terminal leads (to be soldered to a printed wiring board) that are connected to a coil of wire wound around a magnetic core. Each inductor may be in essence a vertically-oriented coil of wire (vertical relative to the horizontal pwb to which it is soldered), but as an alternative, may have a different topology (e.g., horizontally oriented). The inductors are laid out side-by-side on a top surface of the pwb, wired (by metal traces in one or more patterned metal layers of the pwb) such that each of the inductors is oriented with opposite polarity relative to another adjacent one of the inductors. Thus, the polarity of L1 as it is laid out and wired on the pwb is opposite to the polarity of L2, and the polarity of L2 is opposite the polarity of both L1 and L3. The dot convention is used in the schematic here, to denote the voltage polarity of the mutual inductance of any two inductors that are adjacent to each other. Note that a pair of adjacent discrete component inductors here are not coupled inductors, in the sense of a transformer where two coils or wire are wound around a common or magnetically connected core. However, the discrete component inductors here are laid out as close to each as possible so as to create mutual inductance between them, where current going into one dot induces current to come out of the other, adjacent dot. Current "into the dot" means current from the dot towards the inductor symbol, while "out of the dot" means current from the inductor symbol toward the dot. Viewed another way, current going into a dotted terminal of an inductor component induces a positive voltage at another, adjacent dot. Conversely, current leaving a dotted terminal induces a negative voltage at the other, adjacent dot. Viewed yet another way, the dot may indicate the start of the winding in a specified direction, e.g. clockwise.

In a further aspect of the invention, each of the inductors is wired to the output power node 14 of the power switch 11 by a respective metal trace (a), (c), or (e). In addition, each inductor is wired to the capacitor or the output node 17, by a respective second metal trace (b), (d), or (f). The pair of traces (a+b) for L1 has "matched characteristics" with each of the pairs (c+d) and (e+f) for the other two inductors. In other words, the trace width of segment (a) should be essentially equal to the trace width of segment (c) as well as the trace width of segment (e). Also, the width of segment (b) should be essentially the same as the width of segment (d) and segment (f). To further enhance the mutual inductance between these inductors, the sum of the lengths of the first and second traces in each pair should also be about equal. Thus, the length (a+b) should be about equal to (c+d) which should be about equal to (e+f). In a further embodiment of the invention, each of the self-inductances of the individual discrete component inductors L1, L2, and L3 should be equal, although this is not necessary. Note that the total self inductance of a set of two or more parallel connected inductors will be less than the largest individual self-inductance in the set; however the manner in which the discrete component inductors are aligned with each other here, namely with their polarities reversed and their connecting trace characteristics matched, results in boosting the actual total inductance of the inductor circuit 15 (relative to the total self inductance). As an example, consider a trio of identical discrete component inductors, each having a self-inductance of 1 microHenry and a footprint of 2×2.5 mm. Thus, the total area on the pwb consumed by the three inductors would be 15 mm$^2$, exhibiting a boosted total inductance of more than 0.33 microHenry, at a combined current rating of three times the individual rated current of each inductor. In contrast, a single discrete component inductor of about 0.5 microHenry having the same rated current as the trio would be much larger than 15 mm$^2$.

Figure 3:
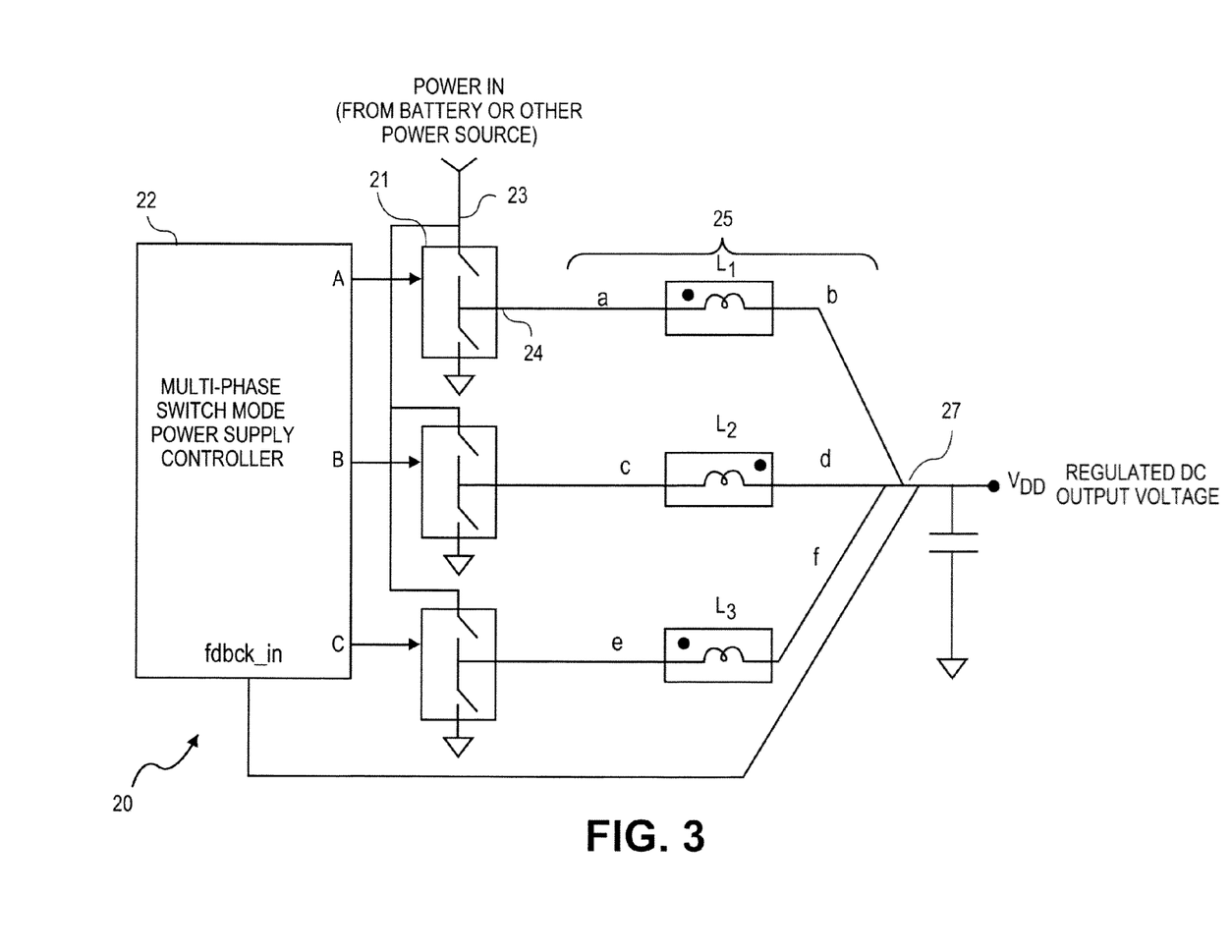
FIG. 3 is a circuit schematic of a multi-phase switch mode power supply circuit.

Turning now to FIG. 3, a multi-phase SMPS 20 is depicted in schematic form. In contrast to the single-phase version of FIG. 2, the multi-phase SMPS 20 has two or more phases, i.e., switched power paths, from the battery or other external power source at power input node 23 to regulated output voltage node 27. The power input node 23 is shared or common to, in this case, three power switches 21 (one for each phase A, B and C). Each of these power switches 21 receives a separate pwm drive signal from a separate control port of a multi-phase SMPS controller 22. The latter still receives a feedback signal from the output node 27, compares it to a reference voltage (not shown) and uses the difference or error between them to maintain a regulated dc output voltage, Vdd, by varying the pulse widths of the three drive signals. There are several reasons for using a multi-phase regulator as opposed to a single-phase regulator, including greater current capability with lower resistive loses (due to the load current now being divided amongst three phases as opposed to just a single phase) and the ability to further minimize the output voltage ripple.

In the embodiment of FIG. 3, an inductor circuit 25 is shown which also has a number of discrete component inductors (in this example, also three), one for each phase. Each inductor has a first terminal connected to its respective power node 24 of the power switch 21, and a second terminal that is connected to the shunt capacitor at the output node 27. Each of these inductors is in a different power phase of the SMPS 20, but exhibits mutual inductance with an adjacent inductor of a different phase. This is achieved by once again a carefully selected layout that places these inductors side-by-side and wires them such that each is oriented with opposite polarity relative to another adjacent one of the inductors (for a different phase). In addition, the inductors are also wired in such a way that the trace widths of segments (a), (c) and (e) are about equal, as are the widths of trace segments (b), (d) and (f). In addition, to further improve the mutual inductance that is desired, the sum of the respective pairs of trace lengths should also be about equal, that is (a+b)=(c+d)=(e+f). For a more balanced solution, each of the inductors may also have the same self-inductance rating and rated currents, e.g. they may all be identical to each other. This arrangement is expected to yield a boost in the actual individual inductance for each phase due to enhanced mutual inductance as the individual inductors "help each other", while also achieving a higher, combined rated current.

Figure 4:
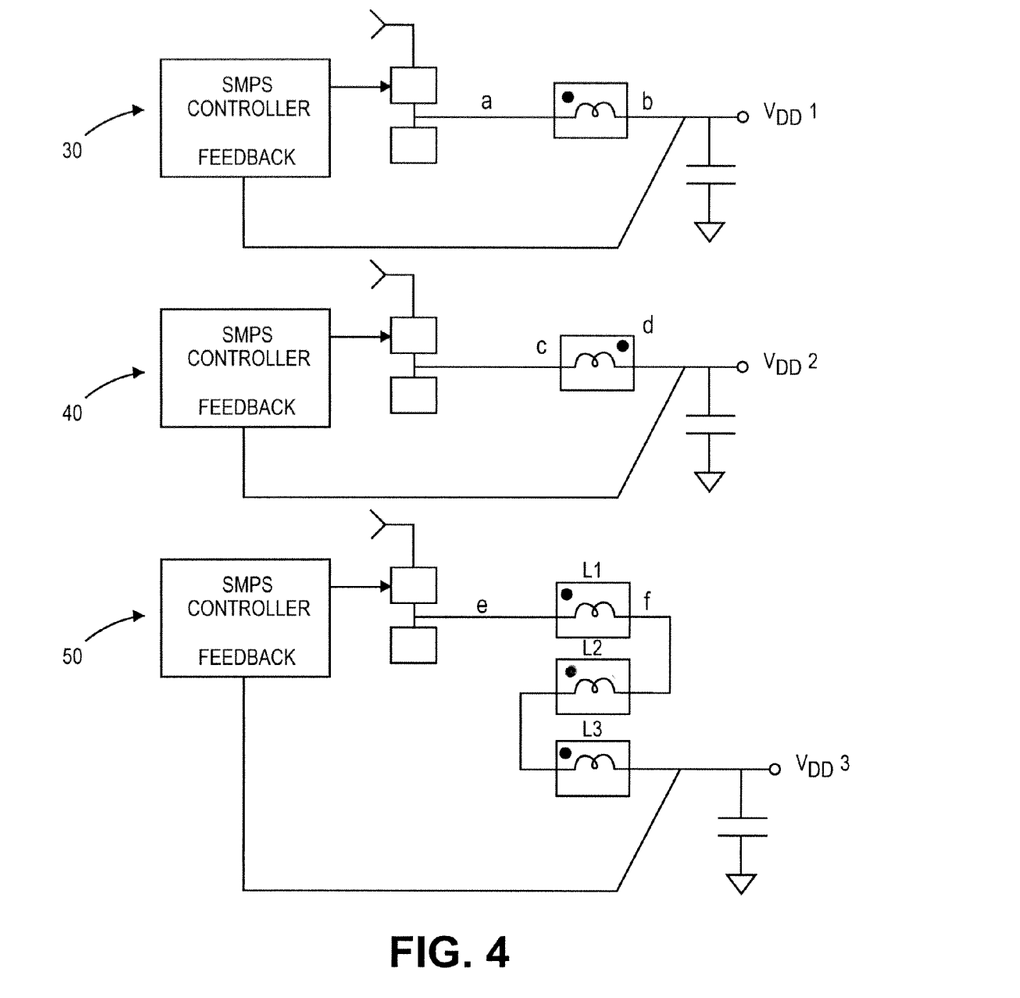
FIG. 4 is a schematic of multiple switch mode power supply circuits providing several dc output voltages simultaneously.

Turning now to FIG. 4, another embodiment of the invention is depicted in schematic form, namely a group of switch mode power supplies 30, 40, 50, where each is to generate its own or separate, regulated dc output voltage Vdd1, Vdd2, Vdd3, respectively. The voltages at the three rails may all be different yet derived from the same battery or other external power source input voltage (that is shared by the respective power switches of each SMPS 30, 40, 50, respectively). Note that although in this example each of the depicted power supplies is a single-phase SMPS, an alternative is to replace one or more of these with a multi-phase SMPS 20. In both cases, the layout of the discrete component conductors as a whole should be such that each one is oriented with opposite polarity relative to another adjacent one; the adjacent inductor may be in the same phase of the same SMPS, or it may be in a different SMPS. In addition to the layout being side-by-side and presenting opposite polarity between adjacent inductors, the traces that connect each inductor to their power switches and the shunt capacitor (regulated dc output node), should have matched characteristics, namely both equal trace width and equal total distance. In other words, trace segments (a,b) that wire the inductor of the SMPS 30 to its power switch and its shunt capacitor, and trace segments (c,d) that wire the inductor of the SMPS 40 to its power switch and its shunt capacitor, should have (a+b)=(c+d).

In another embodiment, still referring to FIG. 4, the inductor circuit of the SMPS 50 has two or more discrete component inductors that are series connected to each other, yet are laid out and wired in such a way as to achieve enhanced total inductance (as compared to a raw sum of their individual self-inductance values). Each of the component inductors in this case is laid out relative to an adjacent one in the series, such that it has opposite polarity but also matched characteristics in terms of their respective connecting traces. Note that due to the physical direction of the dc current path for L2 being opposite that of L1 and L3, L2 is oriented with its dot "on the same side" as that of L1 and L2. Once again, each of these inductors may be a separately packaged, discrete component inductor having a single winding or coil of wire and only two exposed solder terminals.

Figure 5:
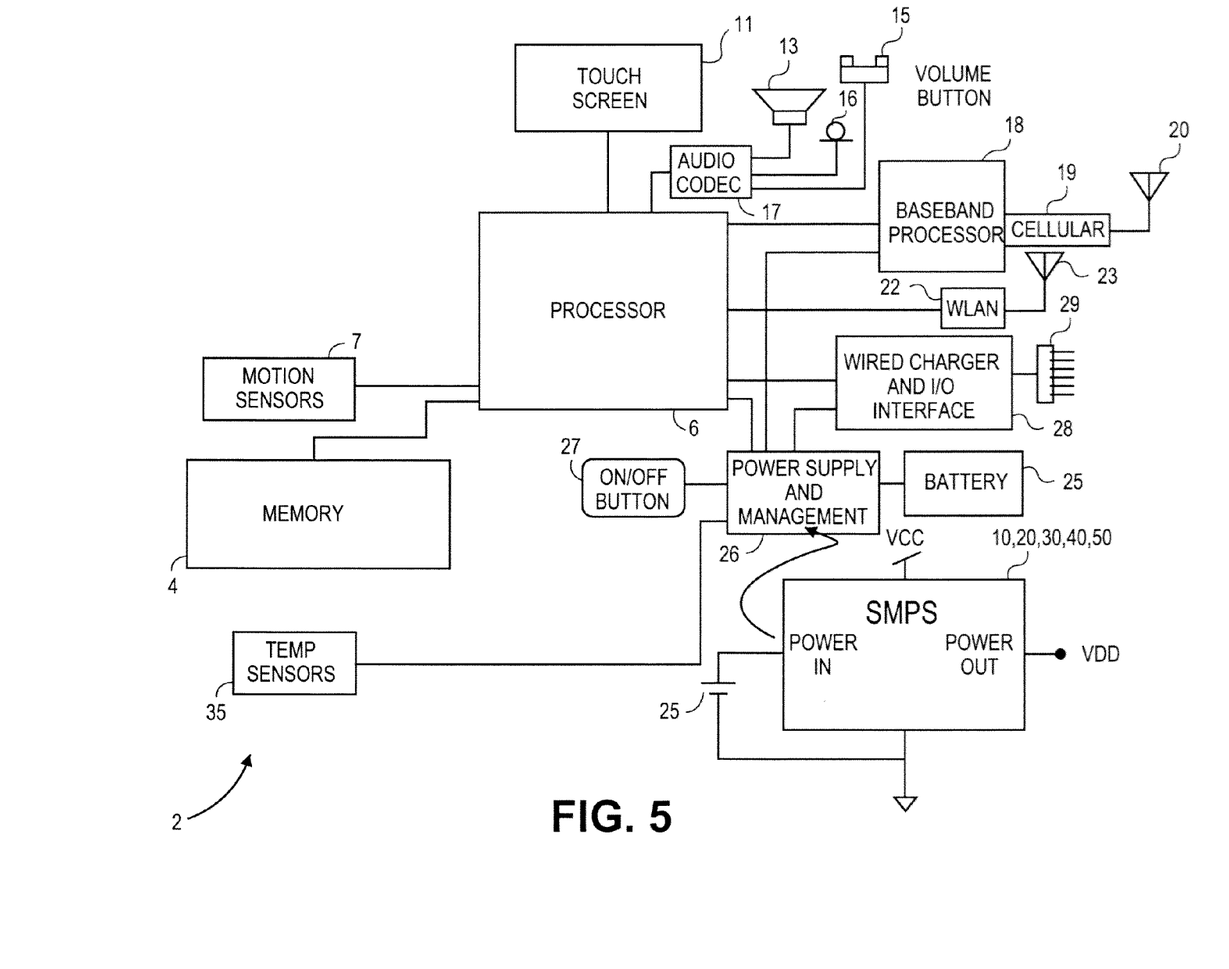
FIG. 5 is a block diagram of the functional unit blocks and hardware components in an example computing system.

FIG. 5 shows a functional unit block diagram and some constituent hardware components of a personal mobile device 2, e.g. as found in an iPhone™ device by Apple Inc. Although not shown, the device 2 has a housing in which the primary mechanism for visual and tactile interaction with its user is a touch sensitive display screen (referred to here as a touch screen) 11. The housing may be essentially a solid volume referred to as a candy bar or chocolate bar types as in the iPhone device. An alternative is one that has a moveable, multi-piece housing, such as a clamshell design, or one with a sliding, physical keypad as used by other cellular and mobile handset or smart phone manufacturers. The touch screen 11 is used to display typical features of visual voicemail, web browser, email, and digital camera viewfinder, as well as others, and to receive input from the user via virtual buttons and touch commands.

For wireless telephony, which enables the user to receive and place audio and/or video calls, downlink audio during a call can be emitted from a speaker 13 (which may be an earpiece speaker or receiver, or it may be a headset earphone). Uplink audio includes the user's speech, which is picked up by a microphone 16 (e.g., mouthpiece microphone or headset microphone). Conversion between analog domain and digital domain for the speaker and microphone signals, in addition to digital audio signal processing for different applications running in the device 2, may be performed within audio codec 17. A physical volume switch or button 15 may also be connected to the codec. The codec 17 may be configured to operate in different modes, e.g. to service a digital media player function (such as an MP3 player that is playing back a music file that is stored in the device 2), as well as a wireless telephony function.

For wireless telephony, a baseband processor 18 is included to perform speech coding and decoding functions upon the uplink and downlink signals, respectively, in accordance with the specifications of a given protocol, e.g. cellular GSM, cellular CDMA, wireless VOIP. A cellular transceiver 19 receives the coded uplink signal from the baseband processor and up converts it to a carrier band before driving an antenna 20 with it; it receives a downlink signal from the antenna 20 and down converts the signal to baseband before passing it to the baseband processor 18. A wireless local area network transceiver 22 receives and transmits data packets from a nearby wireless router or access point, using an antenna 23.

Power is provided to operate the components shown in FIG. 5 by a battery 25 (generically used here to refer to a rechargeable power source that may also include a rechargeable fuel cell). The battery 25 is charged or replenished by an external power source such as a wall plug or automobile battery dc power adapter (not shown) that connects to a multi-pin docking connector 29 that is also integrated in the housing of the device 2. The connector 29 and its associated charger and I/O interface circuitry 28 may be in accordance with any suitable computer peripheral specification such as Universal Serial Bus (USB). The USB protocol allows for the connector 29 and its associated interface 28 to be used for both power transfer to recharge the battery 25 and for data I/O communications. The latter includes docking functions, to synchronize user content in the device 2 with another computer device owned by the user that may have substantially more data storage capacity, e.g. a desktop computer, a laptop/notebook computer.

The user-level functions of the device 2 are implemented under control of a processor 6 that has been programmed in accordance with instructions (code and data) stored in memory 4. The processor 6 and memory 4 are generically used here to refer any suitable combination of programmable data processing components and data storage that conduct the operations needed to implement the various functions of the device. The processor 6 may be an applications processor typically found in a smart phone, while the memory 4 may refer to microelectronic, non-volatile random access memory. An operating system may be stored in the memory 4, along with application programs specific to the various functions of the device, which are to be run or executed by the processor 6 to perform the various functions of the device 2. For instance, there may be a telephony application that (when launched, unsuspended, or brought to foreground) enables the user to "dial" a telephone number to initiate a telephone call using wireless VOIP or a cellular protocol and to "hang up" on the call when finished.

The device 2 presents a particularly challenging task for packaging several switch mode power supplies therein that are used to provide different dc regulated output voltages on different rails. In one scenario, one or more of these power supplies are part of a power management and supply circuit 26. The latter may include an integrated circuit package that the SMPS controllers and also perhaps the power switches described above. This package may also include a programmed processor and associated analog and digital conversion circuitry used for controlling power states for purposes of thermal management in the device 2. In such a setting, the discrete component inductor arrangements described above are expected to fit better within the small confines of the housing of the device 2, while providing a sufficiently high overall or combined current rating, as well as a sufficiently high total inductance value. This enhancement may be due to mutual magnetic coupling between the discrete component inductors that results in a boosted or enhanced total inductance, due to the particular side by side layout described above that yields opposite polarities and matched traces between adjacent inductors.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An electronic device comprising:
 a switching power supply circuit, the switching power supply circuit having:
  a controller with a control output,
  a power switch having a control input coupled to the control output, an input power node coupled to a supply node, and an output power node, and
  an inductor circuit to provide a combined inductance between the output power node and a regulated output voltage node of the switching power supply circuit, the inductor circuit having three or more discrete component inductors directly connected to each other in parallel and laid out and wired such that each of the inductors is oriented with opposite polarity relative to another adjacent one of the inductors,
  wherein the three or more discrete component inductors are laid out close to each other to create mutual inductance.

2. The electronic device of claim 1 wherein each inductor comprises a vertically-oriented coil.

3. The electronic device of claim 1 wherein the switching power supply circuit is a dc to dc buck converter.

4. The electronic device of claim 1 wherein each of the discrete component inductors is wired to the output power node by a respective first trace and to the regulated output voltage node of the switching power supply circuit by a respective second trace,
 the respective pair of first and second traces for each one of the discrete component inductors has matched characteristics with the respective pair of first and second traces for another one of the discrete component inductors.

5. The electronic device of claim 4 wherein the matched characteristics comprise:
 the first and second traces of all pairs have about equal width; and
 the sum of the lengths of the first and second traces in each pair are about equal.

6. The electronic device of claim 1 wherein the regulated output voltage node is further coupled to a capacitor.

7. The electronic device of claim 1 wherein the output power node is shared by the power switch and the inductor circuit.

8. The electronic device of claim 1, wherein current going into a dotted terminal of each discrete component inductor induces a positive voltage at another adjacent discrete component inductor.

9. The electronic device of claim 8, wherein current leaving a dotted terminal of each discrete component inductor induces a negative voltage at another adjacent discrete component inductor.

10. The electronic device of claim 1, wherein actual total inductance of the inductor circuit is greater than total self-inductance of the three or more discrete component inductors of the inductor circuit.

* * * * *